Dec. 25, 1934.  W. FERRIS  1,985,445
HYDRAULIC LOAD BRAKE
Filed Oct. 11, 1930  4 Sheets-Sheet 1

Inventor
WALTER FERRIS.
By
Attorney

Dec. 25, 1934.    W. FERRIS    1,985,445
HYDRAULIC LOAD BRAKE
Filed Oct. 11, 1930    4 Sheets-Sheet 2

Inventor
WALTER FERRIS.
By
Attorney

Dec. 25, 1934.                 W. FERRIS                1,985,445
                           HYDRAULIC LOAD BRAKE
                   Filed Oct. 11, 1930        4 Sheets-Sheet 3
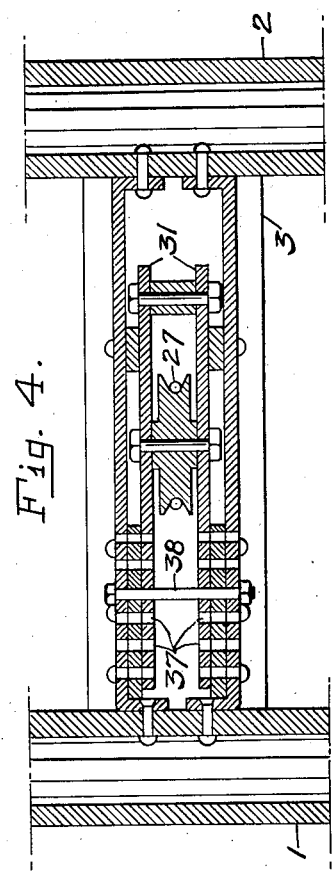
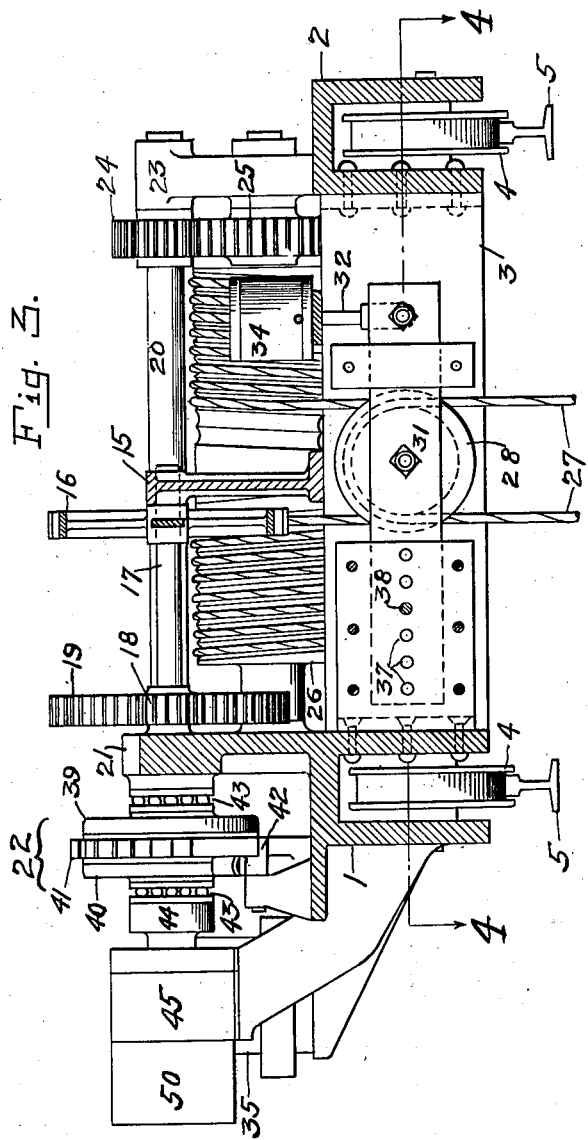
Inventor
WALTER FERRIS.
By *Wesley Merrill*
                              Attorney

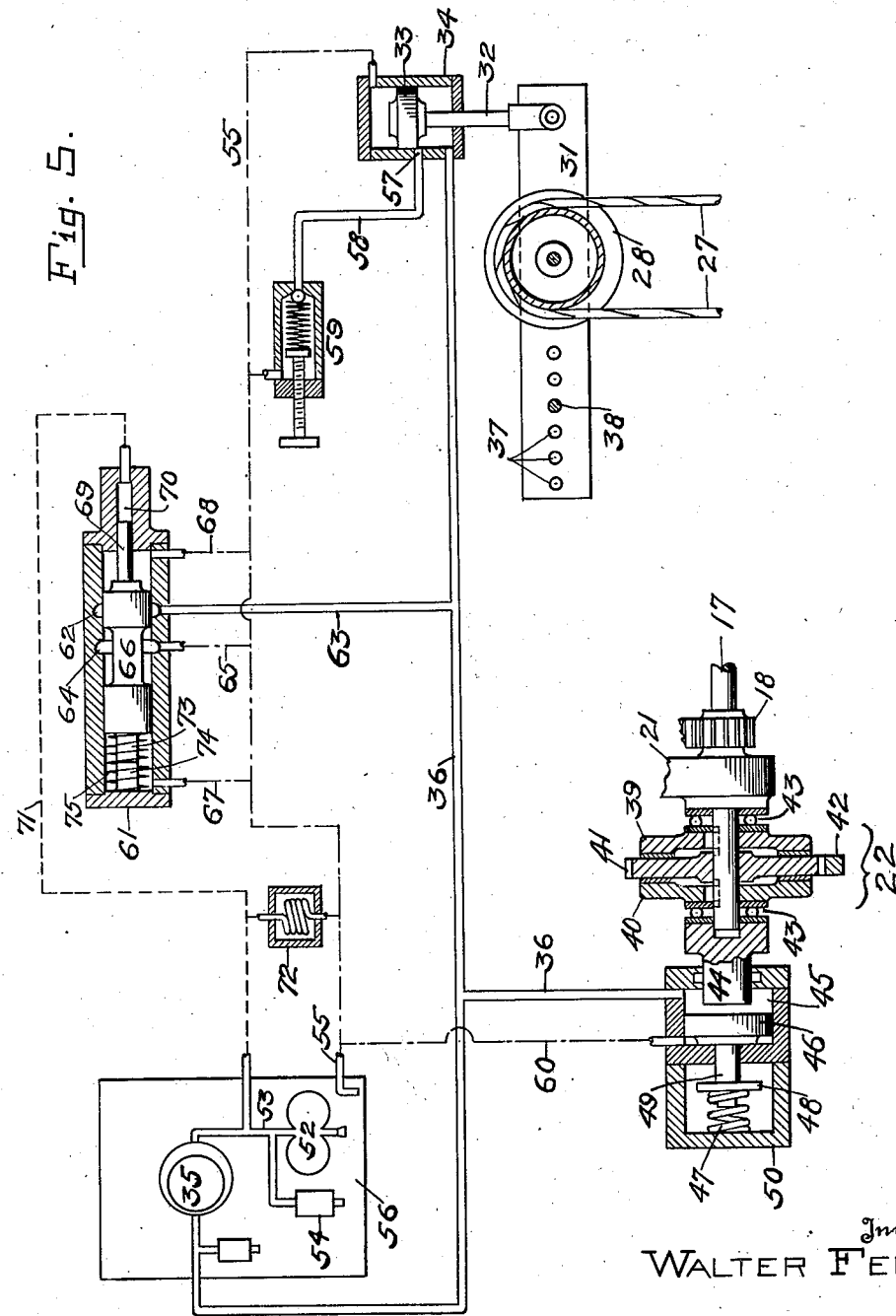

Patented Dec. 25, 1934

1,985,445

UNITED STATES PATENT OFFICE 1,985,445

HYDRAULIC LOAD BRAKE

Walter Ferris, Milwaukee, Wis., assignor to The Oilgear Company, Milwaukee, Wis., a corporation of Wisconsin Application October 11, 1930, Serial No. 488,010

21 Claims. (Cl. 188—82)

This invention relates to load brakes such as are ordinarily employed for controlling the loads carried by electric hoists.

The load brake to which the invention applies in particular is provided with an assembly of friction disks which is connected between the hoisting drum and the hoisting motor to prevent the load from rotating the drum when the motor is idle and to prevent the load from rotating the drum at a faster rate than intended when the motor is being operated to lower the load.

The disk assembly is arranged concentric with or upon one of the shafts through which the motor drives the drum, and it rotates as a unit with that shaft when a load is being raised. When a load is being lowered, the center or inner disk is restrained from rotation by a pawl and the outer disks are urged against the inner disk by the tendency of the load to rotate the drum faster than it is being rotated by the motor.

An object of the invention is to provide a load brake which will operate smoothly and efficiently.

Another object is to keep within narrow limits the energy consumed by a motor in lowering loads of widely varying weights.

Another object is to provide a load brake having a total torque consisting of a substantially constant factor and a factor which is proportional to the load.

Another object is to eliminate the friction created by the mechanical energization of the load brake.

Another object is to provide a hydraulically operated load brake.

Another object is to maintain the braking pressure constant during both the raising and the lowering of the load.

Another object is to provide a hydraulically operated load brake having a mechanically operated safety device.

Another object is to provide a hydraulically operated load brake which is susceptible of close adjustment.

Another object is to provide a hydraulically operated load brake which is positive and precise in operation.

According to the invention in its general aspect, the drum of a hoisting apparatus is provided with a friction brake to restrain it from rotation in one direction, the friction brake is energized by hydraulic means in response to a load tending to rotate the drum in that direction, and the hydraulic means responds to variations in the load to create in the brake a braking force proportional to the load.

According to the invention in another aspect, the total braking force applied by the brake consists of two factors one of which is proportional to the load and the other of which remains constant throughout all variations in load.

According to the invention in another aspect, the brake is provided with a mechanical safety device which applies the brake upon failure of the hydraulic means and which is rendered inoperative by fluid pressure when the hydraulic means is in operation.

The invention is exemplified in the accompanying drawings in which the views are as follows:

Fig. 3 is a section taken on the irregular line 3—3 of Fig. 1.

Fig. 4 is a section taken on the line 4—4 of Fig. 3.

Fig. 5 is a schematic drawing of the hydraulic circuit.

Figure 1:
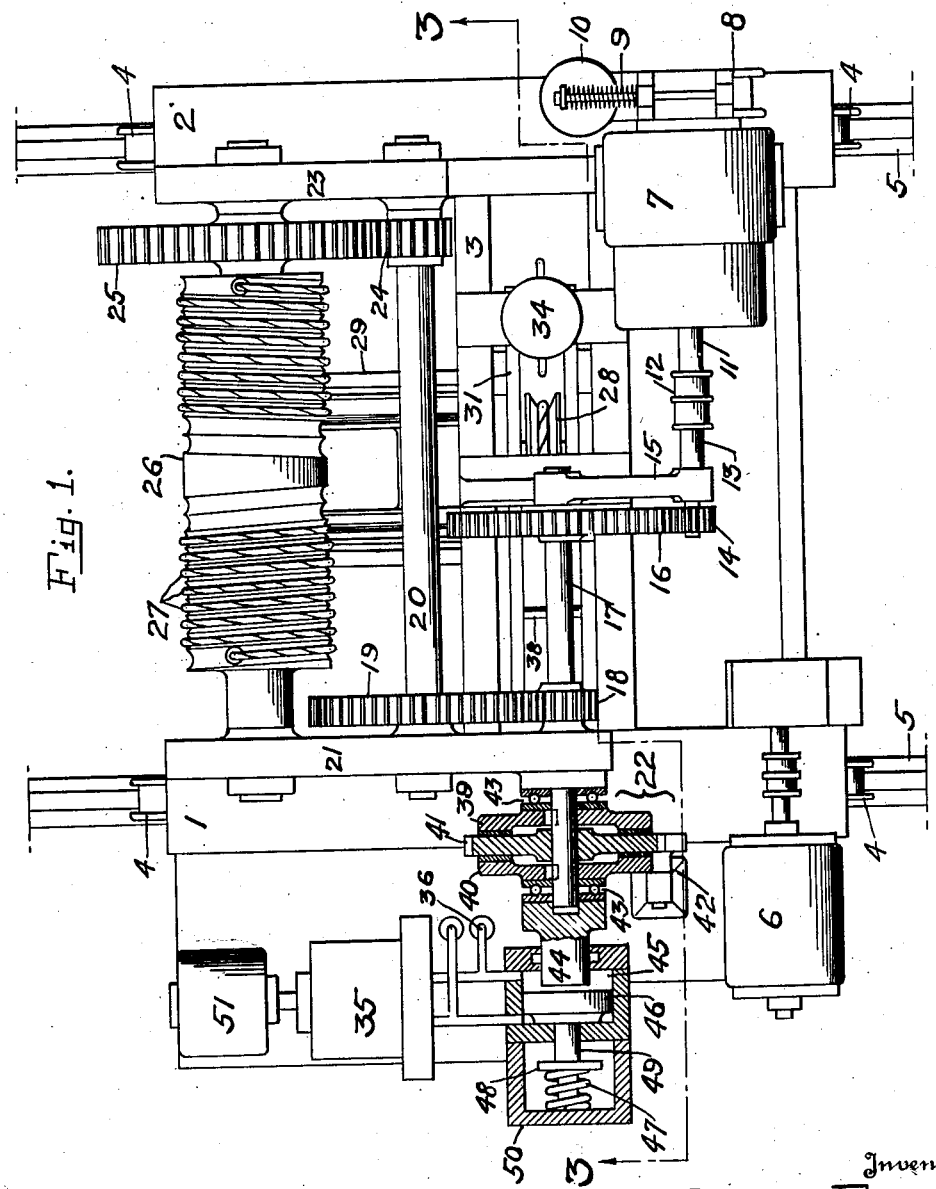
Fig. 1 is a top plan view of a crane trolley to which the invention has been applied.
Figure 2:
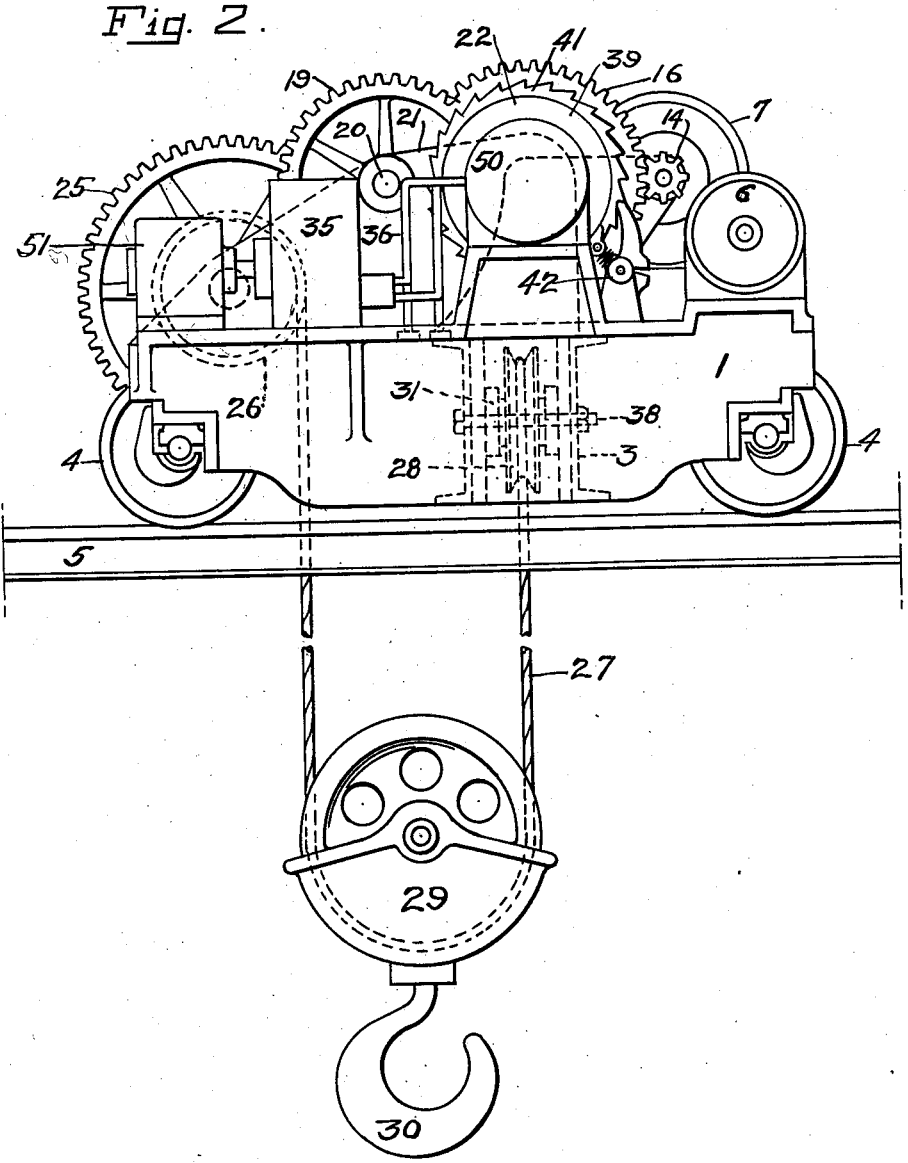
Fig. 2 is an end view thereof.

The invention has been shown applied to the trolley of a well known type of overhead traveling crane but it is not limited to this particular application and, as the trolley per se forms no part of the present invention, but a brief description thereof will be given herein.

The trolley has two side frames 1 and 2 which are held in spaced relation to each other by a girt 3 and provided with wheels 4 to enable the trolley to run upon the rails 5 of the bridge along which it is moved by a trolley motor 6 arranged upon the side frame 1 and connected by suitable gearing to one pair of the wheels 4.

The load is raised and lowered by a hoist motor 7 arranged upon the side frame 2 and provided upon its outer end with a safety brake 8 which is applied by a spring 9 when the motor is not running and released by a solenoid 10 when the motor is running.

The hoist motor 7 has its shaft 11 connected by a coupling 12 to a shaft 13 which is provided upon its outer end with a pinion 14 and is journaled in a bearing 15 carried by the girt 3.

The pinion 14 meshes with a gear 16 which is fixed upon a shaft 17 having a pinion 18 fixed thereon and meshing with a gear 19 fixed upon a shaft 20.

The shaft 17 is journaled in the bearing 15 and in a bearing 21 carried by the side frame 1, and it extends through the bearing 21 for connection to a hydraulically operated brake 22 in which the present invention is embodied.

The shaft 20 has one of its ends journaled in the bearing 21, its other end journaled in a bearing 23 carried by the side frame 2, and it has a pinion 24 fixed thereon intermediate its ends and meshing with a gear 25 which is fixed for rotation with a hoisting drum 26 having its shaft journaled in the bearings 21 and 23.

A hoisting cable 27 is attached at its ends to the drum 26 to be wound thereon and its bight is looped over an anchor sheave 28 to provide four strands of cable which carry a sheave block 29 having a hook 30 to which the load of the crane is attached.

The anchor sheave 28 is ordinarily supported in a stationary position but, in the present invention, it is carried by a lever 31 which is pivoted at one side of the sheave 28 to the girt 3 and connected at the other side of the sheave 28 to the rod 32 of a piston 33 which is arranged in a cylinder 34 carried by the girt 3.

The piston 33 thus supports a part of any load carried by the hook 30 and is supported in the cylinder 34 by liquid supplied from a pump 35 through a pipe 36. Consequently, the pressure exerted by the piston 33 upon the liquid in the cylinder 34 is proportional to the load carried by the cable 27.

In order that the proportion of the load carried by the piston 33 may be varied and thereby vary the pressure exerted by it upon the liquid in the cylinder 34, the lever 31 and the girt 3 are provided with a series of corresponding holes 37 to receive a pivot pin 38 which may be moved toward or from the sheave 28 to decrease or increase the load carried by the piston 33.

The brake 22 has two outer friction disks 39 and 40 slidably keyed upon the shaft 17 and an inner disk 41 journaled upon the shaft 17 between the outer disks. The inner disk 41 has a toothed outer periphery to be engaged by a standard type silent pawl 42 which holds the disk 41 against rotation in one direction but allows it to rotate in the opposite direction.

The brake 22 has been illustrated as having but three friction disks but, in practice, any number of disks may be employed and arranged in three sets in the customary manner.

The outer disks 39 and 40 rotate with the shaft 17 and, preferably, an anti-friction bearing 43 is arranged between the disk 39 and the bearing 21 and between the disk 40 and one end of a plunger 44 which has its other end arranged in a cylinder 45 connected to the pipe 36. Consequently, the plunger 44 is subjected to the hydraulic pressure created by the pump 35 and it presses the disks together to cause the inner disk to be gripped between the outer disks.

The cylinder 45 also contains a piston 46 which has a considerably greater cross-sectional area than the plunger 44 and is urged by a helical compression spring 47 toward the plunger 44 to force it outward and energize the brake 22 whenever the hydraulic pressure in the cylinder 45 falls below a predetermined maximum.

The spring 47, which has the strength required to apply sufficient braking pressure to the disk 40 to enable the brake 22 to support a greater load than the crane is capable of lifting, is arranged between a flange 48 fixed on the stem 49 of the piston 46 and a stationary abutment 50 which is shown as being a cylinder for collecting any liquid which may leak past the stem 49.

When the block 29 is being raised, the disks 39, 40 and 41 rotate as a unit between the anti-friction bearings 43 which enable the plunger 44 to remain stationary and allow the disks to rotate between it and the bearing 21 without adding substantially to the load carried by the motor 7.

When the load is being lowered, the pawl 42 holds the center disk 41 from rotating with the disks 39 and 40, and the friction or braking force created between the contact or braking surfaces of the disks tends to prevent the load from lowering. Consequently, the motor 7 must expend sufficient energy in lowering the block 29 to overcome that part of this friction or braking force which is not balanced by the weight of the load.

The pump 35 is driven continuously by an electric motor 51 when the crane is in operation in order to deliver a constant supply of liquid to the cylinders 34 and 45, and it may be supercharged by a gear pump 52 which is also driven by the motor 51 and is ordinarily combined with the pump 35 to form a standard pump unit.

The pump 52 is connected to the intake of the pump 35 by a pipe 53 having a relief valve 54 connected thereto through which the excess output of the pump 52 is exhausted. The pump unit has not been illustrated nor described in detail herein as it is of well known construction and forms no part of the present invention. Such a pump unit is fully illustrated and described in Patent No. 1,619,200, issued March 1, 1927 to Walter Ferris.

The liquid delivered by the pump 35 to the cylinder 34 raises the piston 33 and thereby causes the pump 35 to develop a pressure proportional to the load carried by the cable 27, and this pressure is transmitted to the cylinder 45 and acts upon the piston 44 thereby creating a braking pressure between the disks 39, 40 and 41 which is proportional to the load and sufficient to hold the same.

Upward movement of the piston 33 causes the liquid or air in the upper end of the cylinder 34 to be expelled into a drain pipe 55 which is connected to the reservoir 56 of the pump 35 and prevents pressure or a vacuum from developing in the upper end of the cylinder 34.

When the piston 33 has risen a predetermined distance, it uncovers a port 57 which is connected to the drain pipe 55 by a pipe 58 through which the liquid delivered by the pump 35 is returned to the reservoir 56. The pipe 58 ordinarily has connected therein an adjustable resistance valve 59 which may be adjusted to offer resistance to the flow of liquid therethrough and thereby cause the pump 35 to create a higher pressure than would be required to support or raise the piston 33.

The load carried by the piston 33 and any resistance provided by the valve 59 causes the pump 35 to develop sufficient pressure to retract the piston 46 against the action of the spring 47 so that, when the crane is in operation, even without load, the brake 22 is energized solely by the pressure upon the inner end of the plunger 44. As the piston 46 is retracted, any liquid in cylinder 45 is expelled through a pipe 60 which connects the outer end thereof to the drain pipe 55.

If the resistance valve 59 is omitted or is adjusted to offer no resistance to the flow of liquid therethrough, the braking surface of the brake 22, the area of the plunger 44 and the area of the piston 33 must be so proportioned that the force exerted by the liquid upon the plunger 44 in response to the force exerted upon the liquid in the cylinder 34 by the piston 33 must be somewhat in excess of the force required to hold the load carried by the cable 27.

Since the force exerted by the piston 33 on the liquid in the cylinder 34 is at all times proportional to the load supported by the piston 33, this excess force is also proportional to the load and increases as the load increases. Therefore, if the several parts are adjusted and proportioned to cause creation under a small load of an excess pressure which is sufficient to provide an adequate safety factor, an unnecessarily high pressure will be created under heavy load and the motor 51 will be required to expend considerable energy in lowering large loads.

In order to avoid the expenditure of energy over and above the amount required to overcome a given safety factor, the resistance valve 59 is adjusted to provide just enough resistance to provide the required safety factor, the braking surfaces of the brake 22 and the cross-sectional areas of the piston 33 and the plunger 44 are so proportioned and the pivot pin 38 so located that the pressure exerted by the piston 33 upon the liquid in the cylinder 34 will create the necessary amount of braking force to balance any load carried by the cable 27, and the pressure created in response to the resistance of the valve 59 will provide an additional braking force or safety factor which is constant throughout all variations in load.

Consequently, only the small amount of energy necessary to overcome this additional braking force is expended by the motor 7 in lowering a load and this small amount of energy remains constant irrespective of the weight of the load.

In order that the spring 47 may energize the brake 22 almost instantly in case the hydraulic pressure in the cylinder 45 should fail, as by the pump 35 failing to function, a safety valve 61 is provided to open the pressure pipe 36 to the drain pipe 55 and thus enable the spring 47 to expel liquid from the cylinder 45 into the pipe 36.

The valve 61 has a port 62 which is connected by a pipe 63 to the pressure pipe 36, a port 64 which is connected to the drain pipe 55 by a pipe 65 and a plunger 66 to control the ports 62 and 64. The ends of the valve casing are also connected to the drain pipe 55 by pipes 67 and 68 in order to allow a free flow of liquid or air from one end of the valve casing to the other end thereof as the plunger 66 is reciprocated.

The plunger 66 has a stem 69 fixed upon its forward end and arranged in a cylinder 70 which is carried by the casing of the valve 61 and connected to the pipe 53 by a pipe 71 and to the drain pipe 55 through a choke 72 arranged between the pipes 55 and 71.

The cylinder 70 is thus open to gear pump pressure which urges the plunger 66 rearward to normally close the port 62 and prevent the escape of liquid from the pressure pipe 36, and the rearward movement of the plunger 66 is limited by an abutment 73 arranged upon its rear end to engage an abutment 74 carried by the casing of the valve 61.

The gear pump 52 thus supercharges the pump 35, holds the valve plunger 66 in closed position against the abutment 74 and exhausts a limited volume of liquid through the choke 72. Any liquid delivered by the pump 52 in excess of these requirements is exhausted through the relief valve 54.

The plunger 66 is urged forward to open the port 62 to the port 64 by a helical compression spring 75 which encircles the abutments 73 and 74 and is held under compression by the gear pump liquid in the cylinder 70.

If the pump 35 should fail to function, the gear pump 52 would also fail to function as it is driven in unison therewith and the pressure in the cylinder 70 would drop and allow the spring 75 to advance the plunger 66 and open the port 62 to the port 64, the liquid in the cylinder 70 being expelled through the pipe 71 and the choke 72 to the drain pipe 55. The spring 47 is then able to advance the piston 46 against the plunger 44 and energize the brake 22, the liquid in the cylinder 45 being expelled through the pipes 36 and 63, the valve 61 and the pipe 65 to the drain pipe 55.

The load brake set forth herein is susceptible of various modifications and adaptations without departing from the scope of the invention as hereafter claimed.

The invention is hereby claimed as follows:

1. A hydraulic load brake, for a drum having a load-carrying cable wound thereon, comprising a friction brake connected to said drum to hold the same against rotation in one direction and thereby support a load carried by said cable, a hydraulic motor for energizing said friction brake and causing it to create a braking force proportional to the fluid pressure in said motor, means for supplying motive liquid to said motor, and means for varying the fluid pressure in said motor in response to variations in the load carried by said cable.

2. A load brake, for a drum having a load-carrying cable wound thereon, comprising a friction brake connected to said drum to hold the same against rotation in one direction and thereby support a load carried by said cable, and means responsive to variations in the load carried by said cable and to a constant predetermined resistance for energizing said friction brake to create a total braking force consisting of a factor which is proportional to the load carried by said cable and another factor which remains substantially constant throughout all variations in said load.

3. A hydraulic load brake, for a drum having a load-carrying cable wound thereon, comprising a friction brake connected to said drum to hold the same against rotation in one direction and thereby support a load carried by said cable, hydraulic means responsive to the load carried by said cable and to a constant predetermined resistance for energizing said friction brake to create a total braking force consisting of a factor which is proportional to the load carried by said cable and another factor which remains substantially constant throughout all variations in said load, and mechanical means for energizing said friction brake upon said hydraulic means failing to function.

4. A hydraulic load brake, for a drum having a load-carrying cable wound thereon, comprising a friction brake connected to said drum to hold the same against rotation in one direction and thereby support a load carried by said cable, hydraulic means for energizing said friction brake, means responsive to variations in the load carried by said cable for controlling the fluid pressure in said hydraulic means and thereby causing said friction brake to create a braking force proportional to said load, and mechanical means for energizing said friction brake after the pressure in said hydraulic means has fallen to a predetermined minimum.

5. A hydraulic load brake, for a drum having a load-carrying cable wound thereon, comprising a friction brake connected to said drum to hold the same against rotation in one direction and thereby support a load carried by said cable, a hydraulic motor for energizing said friction brake and causing it to create a braking force proportional to the fluid pressure in said motor, means for supplying motive liquid to said motor, means responsive to variations in the load carried by said cable for causing said liquid supplying means to create in said motor a fluid pressure proportional to said load, and means for causing said liquid supplying means to increase the pressure in said motor by a predetermined amount which remains constant throughout all variations in the load carried by said cable.

6. A hydraulic load brake, for a drum having a load-carrying cable wound thereon, comprising a friction brake connected to said drum to hold the same against rotation in one direction and thereby support a load carried by said cable, hydraulic means for energizing said friction brake, means responsive to variations in the load carried by said cable for controlling the fluid pressure in said hydraulic means and thereby causing said friction brake to create a braking force proportional to said load, means for increasing the pressure in said hydraulic means a predetermined amount which remains constant throughout all variations in the load carried by said cable, and mechanical means for energizing said friction brake after the pressure in said hydraulic means has fallen to a predetermined minimum.

7. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a pump connected to said brake cylinder for supplying liquid thereto, a pressure cylinder having an inlet near one end thereof connected to said pump in parallel with said brake cylinder and a discharge outlet spaced from said inlet, and a piston arranged in said pressure cylinder between said inlet and said outlet and connected to said cable to support a definite part of its load to thereby cause said pump to create a pressure in said brake cylinder proportional to the load carried by said cable.

8. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a pump connected to said brake cylinder for supplying liquid thereto, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create a pressure in said brake cylinder proportional to the load carried by said cable, and mechanical means for energizing said friction brake upon said pump failing to function.

9. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a pump connected to said brake cylinder for supplying liquid thereto, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create a pressure in said brake cylinder proportional to the load carried by said cable, and a resistance valve connected to said outlet to resist the flow of liquid therethrough and thereby cause said pump to create in said brake cylinder an additional pressure which remains substantially constant throughout all variations in the load carried by said cable.

10. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a pump connected to said brake cylinder for supplying liquid thereto, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create in said brake cylinder a pressure proportional to the load carried by said cable, a resistance valve connected to said outlet to resist the flow of liquid therethrough and thereby cause said pump to create an additional pressure in said brake cylinder which remains substantially constant throughout all variations in the load carried by said cable, and mechanical means for energizing said friction brake upon said pump failing to function.

11. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a pump connected to said brake cylinder for supplying liquid thereto, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create a pressure in said brake cylinder proportional to the load carried by said cable, mechanical means for energizing said friction brake to create a maximum braking force therein and normally held inoperative by the liquid in said brake cylinder, and a safety valve operable upon said pump failing to function for quickly releasing the liquid in said brake cylinder and thereby enabling said mechanical means to energize said friction brake substantially instantly.

12. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a pump connected to said brake cylinder for supplying liquid thereto, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create a pressure in said brake cylinder proportional to the load carried by said cable, a resistance valve connected to said outlet to resist the flow of liquid therethrough and thereby cause said pump to create an additional pressure in said brake cylinder which remains substantially constant thoughout all variations in the load carried by said cable, mechanical means for energizing said friction brake to create a maximum braking force therein and normally held inoperative by the liquid in said brake cylinder, and a safety valve operable upon said pump failing to function for quickly releasing the liquid in said brake cylinder and thereby enabling said mechanical means to energize said friction brake substantially instantly.

13. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a piston arranged in said brake cylinder and having a substantially larger cross-sectional area than the other piston, a spring for urging the larger piston against the smaller piston to cause the same to energize said brake and having sufficient strength to cause said brake to create a high braking force, a pump connected to said brake cylinder for supplying liquid thereto to operate said small piston and to retract said large piston against the action of said spring, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create a pressure in said brake cylinder proportional to the load carried by said cable, and a resistance valve connected to said outlet to resist the flow of liquid therethrough and thereby cause said pump to create an additional pressure in said brake cylinder which remains substantially constant throughout all variations in the load carried by said cable.

14. A hydraulic load brake, for a drum having a load-carrying cable wound thereon, comprising a friction brake connected to said drum to hold the same against rotation in one direction and thereby support a load carried by said cable, a piston and a cylinder for energizing said friction brake, a piston arranged in said brake cylinder and having a substantially larger cross-sectional area than the other piston, a spring for urging the larger piston against the smaller piston to cause the same to energize said brake and having sufficient strength to cause said brake to create a high braking force, a pump connected to said brake cylinder for supplying liquid thereto to operate said small piston and to retract said large piston against the action of said spring, a pressure cylinder having an inlet near one end thereof connected to said pump in parallel with said brake cylinder and a discharge outlet spaced from said inlet, a piston arranged in said pressure cylinder between said inlet and said outlet and connected to said cable to support a definite part of its load to thereby cause said pump to create a pressure in said brake cylinder proportional to the load carried by said cable, a resistance valve connected to said outlet to resist the flow of liquid therethrough and thereby cause said pump to create an additional pressure in said brake cylinder which remains substantially constant throughout all variations in the load carried by said cable, and a safety valve operable upon said pump failing to function for quickly releasing the liquid in said brake cylinder to enable said spring to advance said large piston and thereby energize said friction brake.

15. In a mechanical hoist having a support, a hoisting drum and a cable anchor carried by said support and a cable attached to said drum and said anchor to support a sheave block between the same, the combination of a brake connected to said drum and resisting rotation thereof in one direction to support a load carried by said block, a piston and a cylinder for energizing said brake, a pressure cylinder carried by said support and having an inlet near its lower end connected to said brake cylinder in parallel therewith and an outlet spaced from said inlet, a piston arranged in said pressure cylinder between said inlet and said outlet, a lever supporting said anchor and pivoted to said support and to the piston in said pressure cylinder, and a pump connected to both of said cylinders to supply liquid thereto and to create sufficient pressure to raise said anchor supporting piston and thereby cause the liquid in said brake cylinder to energize said brake with a force proportional to the load carried by said cable.

16. In a mechanical hoist having a support, a hoisting drum and a cable anchor carried by said support and a cable attached to said drum and said anchor to support a block between the same, the combination of a brake connected to said drum and resisting rotation thereof in one direction to support a load carried by said block, a piston and a cylinder for energizing said brake, a pressure cylinder carried by said support and having an inlet near its lower end connected to said brake cylinder in parallel therewith and an outlet spaced from said inlet, a piston arranged in said pressure cylinder between said inlet and said outlet, a lever supporting said anchor and pivoted to said support and to the piston in said pressure cylinder, a pump connected to both of said cylinders to supply liquid thereto and to create sufficient pressure to raise said anchor supporting piston and thereby cause the liquid in said brake cylinder to energize said brake with a force proportional to the load carried by said cable, and means to change the effective length of said lever and thereby vary the load carried by said anchor supporting piston relatively to the load carried by said cable.

17. In a mechanical hoist having a support, a hoisting drum and a cable anchor carried by said support and a cable attached to said drum and said anchor to support a block between the same, the combination of a brake connected to said drum and resisting rotation thereof in one direction to support a load carried by said block, a piston and a cylinder for energizing said brake, a pressure cylinder carried by said support and having an inlet near its lower end connected to said brake cylinder in parallel therewith and an outlet spaced from said inlet, a piston arranged in said pressure cylinder between said inlet and said outlet, a lever supporting said anchor and pivoted to said support and to the piston in said pressure cylinder, a pump connected to both of said cylinders to supply liquid thereto and to create sufficient pressure to raise said anchor supporting piston and thereby cause the liquid in said brake cylinder to energize said brake with a force proportional to the load carried by said cable, and a resistance valve connected to the outlet of said pressure cylinder to resist the flow of liquid therefrom and thereby cause said pump to create an additional pressure in said brake cylinder which remains substantially constant throughout all variations in the load carried by said block.

18. A hydraulic load brake, for a drum having a load-carrying cable wound thereon, comprising a friction brake connected to said drum to hold the same against rotation in one direction and thereby support a load carried by said cable, hydraulic means for energizing said friction brake, means responsive to variations in the load carried by said cable for controlling the pressure in said hydraulic means and thereby causing said friction brake to create a braking force proportional to said load, and means for varying the ratio between said braking force and said load.

19. A load brake, for a drum having a load-carrying cable wound thereon, comprising a friction brake connected to said drum to hold the same against rotation in one direction and thereby support a load carried by said cable, means responsive to the load carried by said cable and to a constant predetermined resistance for energizing said friction brake whereby the total braking force consists of a factor which is proportional to the load carried by said cable and another factor which remains substantially constant throughout all variations in said load, and means for varying the ratio between said load factor and said load.

20. A hydraulic load brake, for a drum having a load-carrying cable wound thereon, comprising a friction brake connected to said drum to hold the same against rotation in one direction and thereby support a load carried by said cable, hydraulic means for energizing said friction brake, a pump for supplying liquid to said hydraulic means to operate the same, and pressure control means connected in circuit with said pump and said hydraulic means and connected to said cable to support a part of said load and cause said pump to create in said hydraulic means a pressure which varies in accordance with variations in said load.

21. A hydraulic load brake, for a drum having a load-carrying cable wound thereon, comprising a friction brake connected to said drum to hold the same against rotation in one direction and thereby support a load carried by said cable, hydraulic means for energizing said friction brake, a pump for supplying liquid to said hydraulic means to operate the same, a cylinder connected in circuit with said pump and said hydraulic means, and a piston connected to said cable to support a part of said load and supported in said cylinder by the liquid therein to thereby cause said pump to create in said hydraulic means a pressure which varies in accordance with variations in said load.

WALTER FERRIS.